United States Patent [19]

Schmidt

[11] Patent Number: 4,958,398
[45] Date of Patent: Sep. 25, 1990

[54] ROBOT CLEANER FOR USE BETWEEN PARALLEL PLATENS

[76] Inventor: Charles J. Schmidt, P.O Box 757, Diboll, Tex. 75941

[21] Appl. No.: 389,912

[22] Filed: Aug. 7, 1989

[51] Int. Cl.[5] .............................................. B23D 79/02
[52] U.S. Cl. ....................................... 15/93.1; 15/93.4
[58] Field of Search ................ 15/93 R, 93 C, 77, 102

[56] References Cited

U.S. PATENT DOCUMENTS

| | | | |
|---|---|---|---|
| 2,637,057 | 5/1953 | Moore | 15/93 C X |
| 2,752,621 | 7/1956 | Warsaw | 15/93 C X |
| 2,799,879 | 7/1957 | Frese | 15/93 C X |
| 3,083,388 | 4/1963 | Kort | 15/93 C X |
| 3,110,050 | 11/1963 | Sainio | 15/93 C X |
| 3,217,348 | 11/1965 | Simmons | 15/93 C X |
| 3,703,016 | 11/1972 | Schramm et al. | 15/93 R X |
| 3,840,933 | 10/1974 | Schwab et al. | 15/236.09 X |
| 3,902,214 | 9/1975 | Schmitt | 15/93 C X |
| 4,428,090 | 1/1984 | Coggin et al. | 15/93 C |

FOREIGN PATENT DOCUMENTS 1253677  8/1986  U.S.S.R. ................ 15/93 R

Primary Examiner—Henry J. Recla
Assistant Examiner—Robert M. Fetsuga
Attorney, Agent, or Firm—Fulbright & Jaworski

[57] ABSTRACT

A robot cleaner for insertion between parallel platens for cleaning the platens. A body having first and second sections movable away and toward each other by an air bladder. Said sections include gripping and scraping blades, each of the sections includes sides movable transversely toward the plate by a bladder. One of the sections grips the platens while the second section traverses across the plates and scrapes and cleans the plates.

8 Claims, 4 Drawing Sheets

ROBOT CLEANER FOR USE BETWEEN PARALLEL PLATENS

BACKGROUND OF THE INVENTION

The present invention is generally directed to a robot cleaner for cleaning the surface of at least one plate which is spaced parallel to a second plate. In particular, the present robot cleaner is useful for insertion between first and second spaced and parallel plywood press platens for cleaning the platens.

In the plywood industry, sheets of plywood are manufactured by being pressed together by first and second platens. However, resins from the plywood build up on the platens and must be periodically cleaned. At the present time, this task is performed manually by scrapers. This manual cleaning function is both time consuming, labor intensive and thus expensive.

The present invention is directed to a robot cleaner which can be inserted between parallel first and second plates and may scrape the top and/or bottom sides of the plates. Actuating means actuates the robot to move into engagement with the plates, traverses and cleans the plates, and can be steered as required.

SUMMARY

The present invention is directed to a robot cleaner for cleaning the surface of at least a first plate spaced from a parallel second plate and includes a body having first and second sections connected together but movable relative to each other. First actuating means are connected to said first and second sections for moving said sections away and toward each other for moving the sections parallel to said first and second plates. The first section includes first and second sides connected together but movable relative to each other with second actuating means connected to the sides for moving the sides transverse to the first and second plates. The second section includes third and fourth sides connected together but movable relative to each other by third actuating means for moving the third and fourth sides transverse to the plates. Cleaning means are provided on at least one side of each of the sections for positioning against the plate or plates to be cleaned as the cleaning means engages and moves along the plate. Control means are connected to the first, second and third actuating means for sequentially gripping the first and second plates by one of the sections and moving the other section parallel to and across the plates.

Still a further object of the present invention is wherein cleaning means are provided on each of the sides for engaging and cleaning both the first and second plates.

Yet a still further object is wherein the actuating means includes fluid actuated resilient containers.

Still a further object of the present invention is wherein the control means includes different force means for selective application to the third and second actuating means.

Yet a still further object of the present invention is wherein the first actuating means includes first and second traverse means for steering and controlling the direction of movement of the body.

A yet further object of the present invention is the provision of a robot cleaner for insertion between first and second spaced and parallel press platens for cleaning the platens. The cleaner includes a body having first and second sections with a first air bladder actuating means connected between the sections for moving the sections away and toward each other in a direction parallel to the platens when the body is positioned between the platens. The first section includes first and second sides with a second air bladder actuating means connected between the first and second sides for moving the sides transverse to the platens when the body is positioned between the platens. The second section includes third and fourth sides with a third air bladder actuating means connected between the third and fourth sides for moving the third and fourth sides transverse to the platens when the body is positioned between the platens. A scraper blade is positioned on each of the sides for engaging one of the platens when the sides are moved transversely by the second and third bladder actuating means. A control means is connected to the first, second and third actuating means for engaging the first and second platens with the blades of one section while engaging the first and second platens with the blades of the other section with a greater force than the blades of the one section and moving the one section to and across the platens.

Other and further objects, features and advantages will be apparent from the following description of a presently preferred embodiment of the invention, given for the purpose of disclosure and taken in conjunction with the accompanying drawings.

DESCRIPTION OF THE PREFERRED EMBODIMENT

While the present invention will be described as a robot cleaner for insertion between first and second spaced and parallel plywood press platens for cleaning the platens, the present invention may be utilized for cleaning the surface of at least one plate spaced from a parallel second plate.

Figure 1:
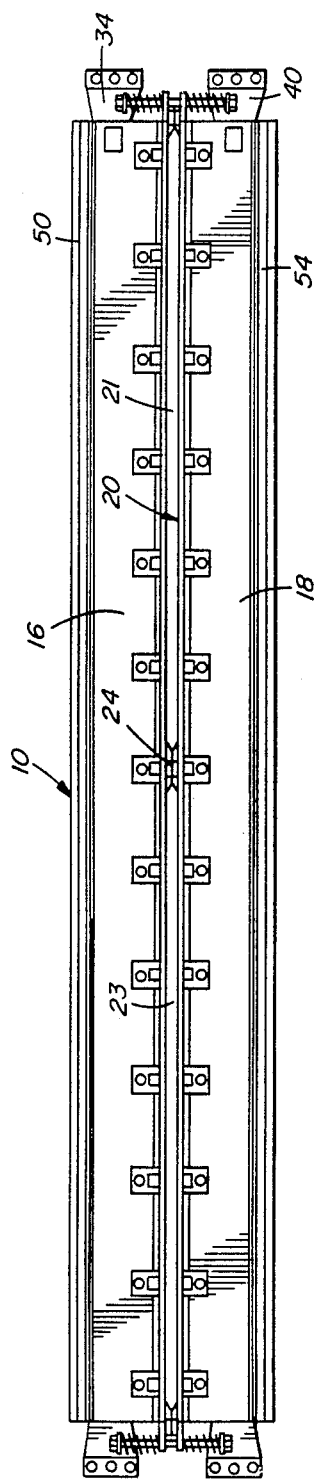
FIG. 1 is a top elevational view of the robot cleaner of the Present invention.
Figure 2:
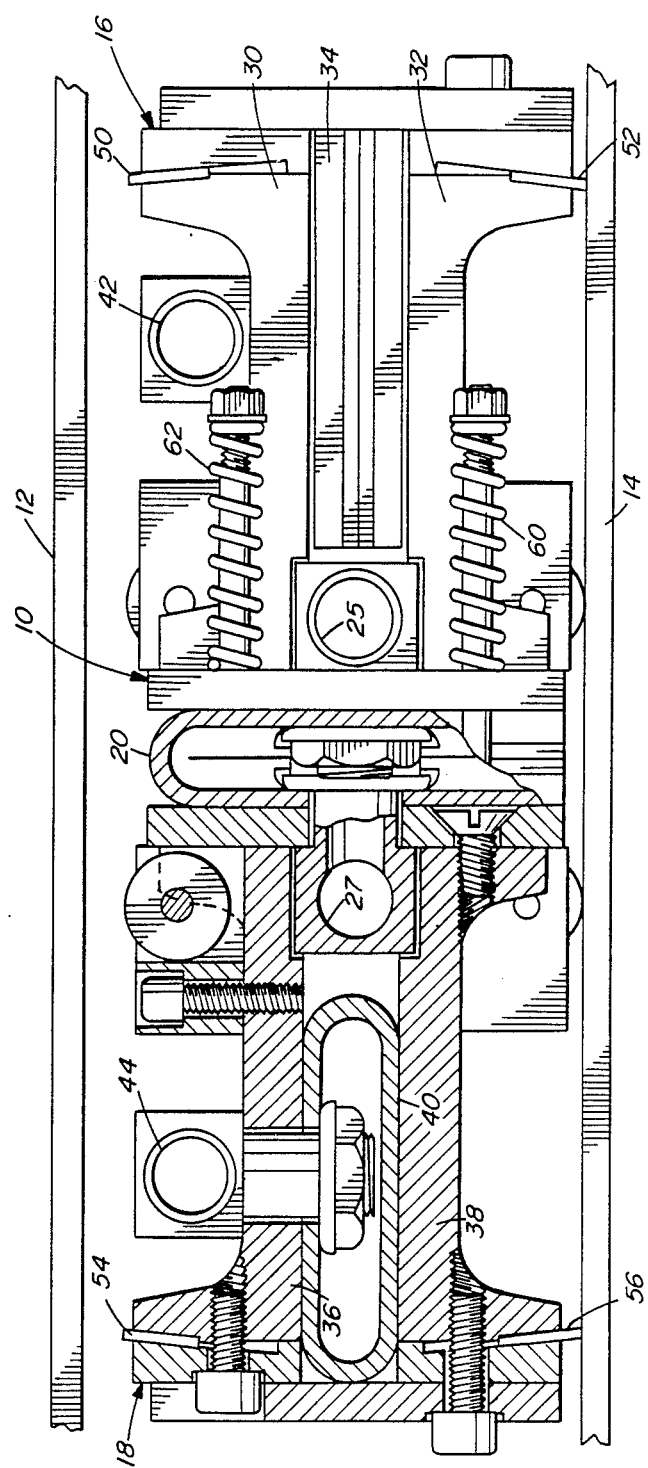
FIG. 2 is an enlarged cross-sectional view of the cleaner of FIG. 1 positioned between two parallel plywood press platens.
Figure 3:
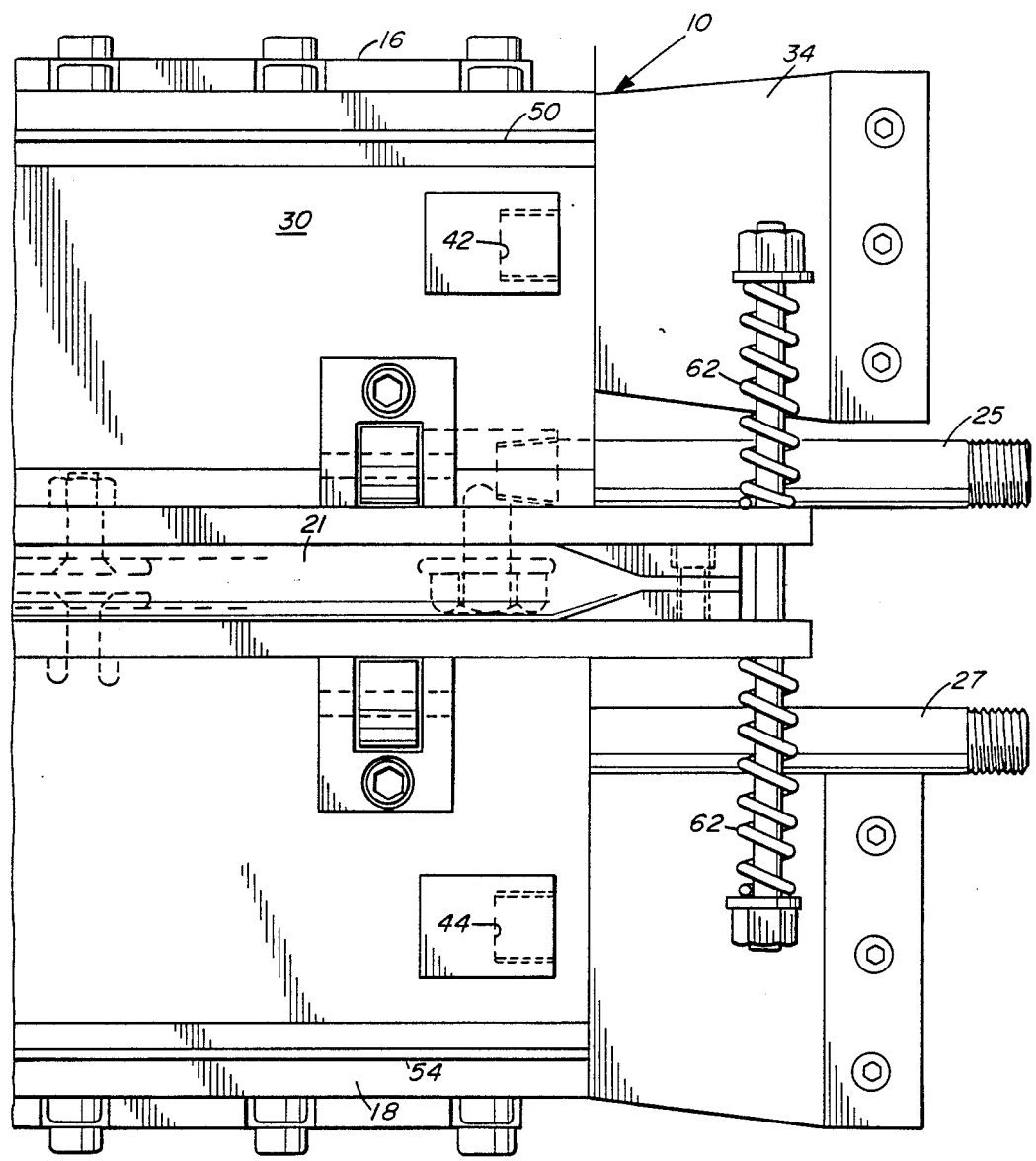
FIG. 3 is an enlarged fragmentary elevational view of one end of the robot cleaner.

Referring now to the drawings, and particularly to FIGS. 1, 2 and 3, the reference numeral 10 generally indicates the robot cleaner of the present invention for insertion between first and second spaced and parallel press platens 12 and 14 (FIG. 2). The cleaner 10 includes a body having a first section 16 and a second section 18. The first and second sections 16 and 18 are connected together, but are movable relative to each other. A first air bladder actuating means 20 is connected between the first 16 and the second 18 sections for moving the sections away and toward each other as the bladder 20 is inflated and deflated. As will be more fully discussed hereinafter, the bladder 20 is capable of moving the sections 16 and 18 in a direction parallel to the first 12 and second platens 14 when the body is positioned between the first and second platens 12 and 14. Preferably, the bladder 20 includes two separate parts 21 and 23 (FIG. 1) separated by a clamp 24 which can be selectively filled and emptied for steering or controlling the direction of movement of the robot 10.

Preferably, the bladder parts 21 and 23 are actuated by air. As best seen in FIGS. 2 and 3, air inlet 25 is connected to bladder 21 and air inlet 27 is connected to bladder 23.

The first section 16 includes a first side 30 and a second side 32 which are connected together but are movable relative to each other. Second air bladder actuating means 34 is connected between the first side 30 and the second side 32 for moving the first and second sides 30 and 32 transverse to the first and second platens 12 and 14 when the body is positioned between the platens 12 and 14.

The second section 18 includes third 36 and fourth 38 sides connected together but movable relative to each other. A third air bladder actuating means 40 is connected between the third side 34 and fourth side 38 for moving the third and fourth sides 36 and 38 transverse to the first and second platens 12 and 14 when the body is positioned between the first and second platens 12 and 14.

Air inlets 42 and 44 are provided for the air bladders 34 and 40, respectively.

Figure 4:
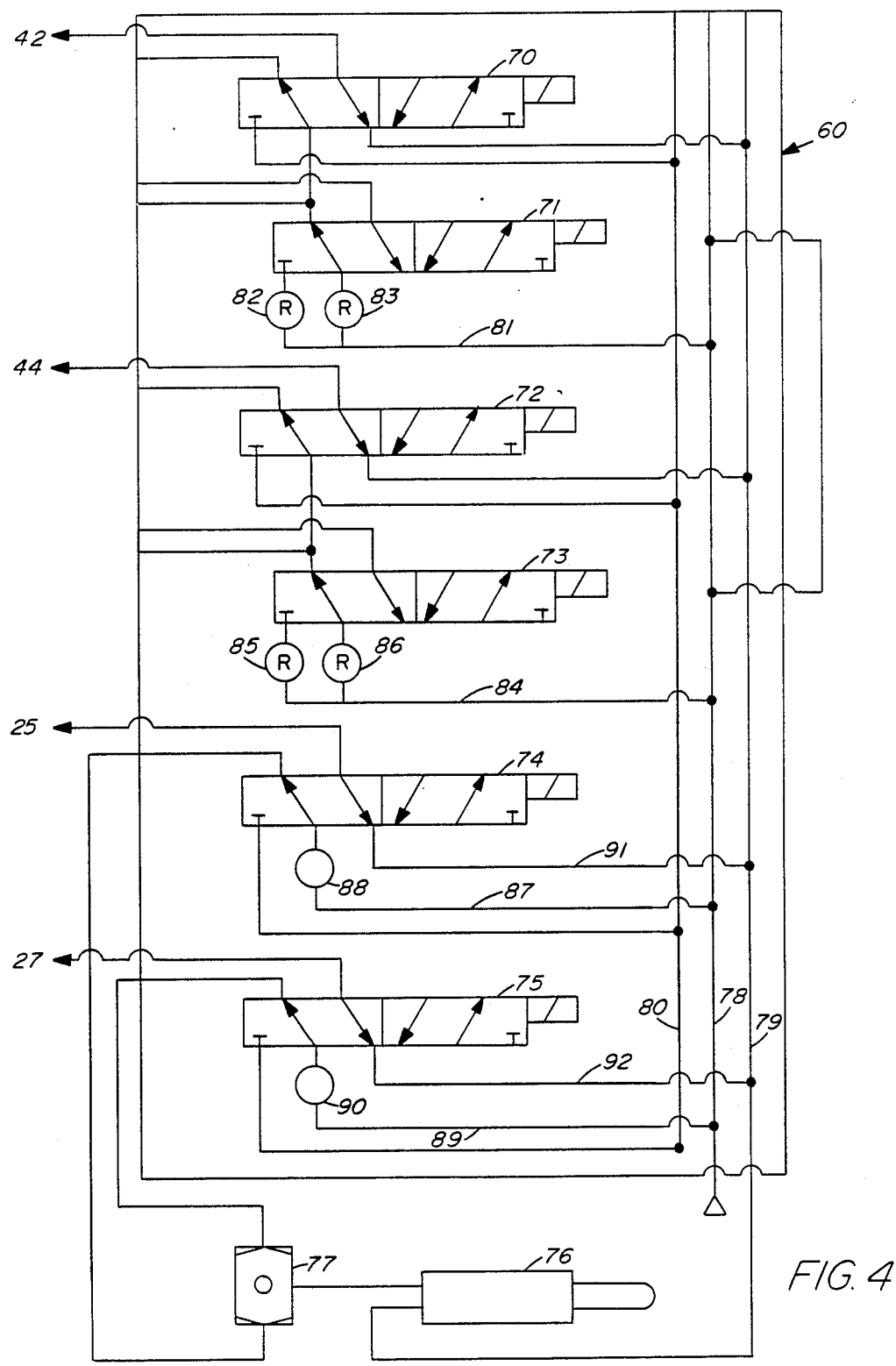
FIG. 4 is a schematic diagram of a control circuit for actuating the robot cleaner.
Figure 5C:
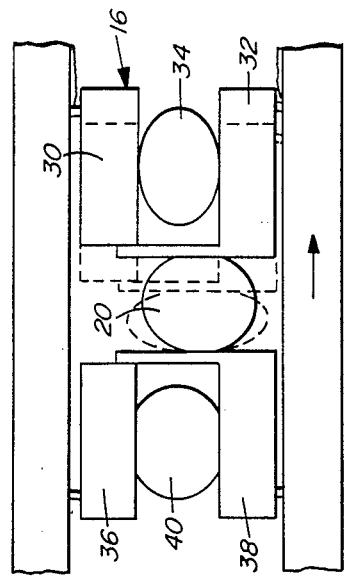
FIGS. 5A, 5B, 5C, 5D and 5E are schematics of the sequence of operation of the robot cleaner.
Figure 5B:
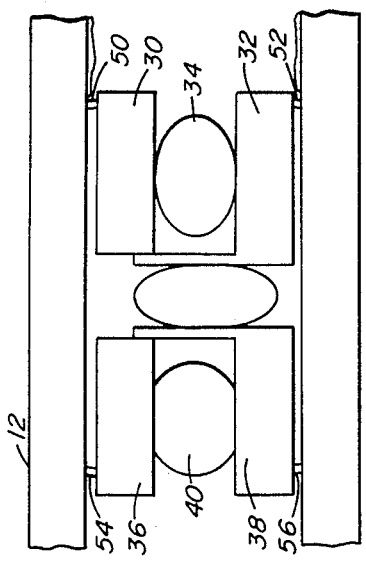
Figure 5A:
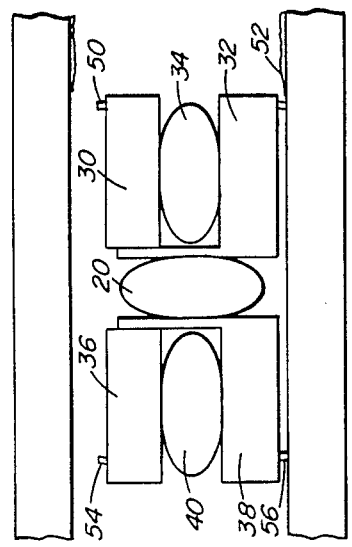

Cleaning means, such as a gripper and scraper blade, is provided on at least one side of each of the sections 16 and 18 and is preferably on each of the sides 30, 32, 36 and 38 for gripping and scraping the inside of the platens 12 and 14. Thus, gripping and scraper blades 50, 52, 54 and 56 are provided on the sides 30, 32, 36, and 38, respectively Control means, generally indicated by the reference numeral 60 in FIG. 4, is connected to the first, second and third actuating means 20, 34 and 40 for sequentially gripping the first and second platens 12 and 14 by one of the sections 16 or 18 and moving the other section parallel to and across the inside of the platens 12 and 14 for cleaning the inside of the platens 12 and 14. The sequence of operation may be more clearly shown in the sequence diagrams in FIGS. 5A, 5B, 5C, 5D and 5E. In FIG. 5A, all of the first, second and third actuating means 20, 34 and 40 are deflated and the robot 10 rests on the bottom platen 14. In FIG. 5B, bladder 34 is inflated causing sides 30 and 32 to move transversely toward the platens 12 and 14 and engage their insides with blades 50 and 52. Also, air bladder 40 is inflated, and is inflated with a greater pressure than bladder 34 causing the sides 36 and 38 to grip the insides of the platens 12 and 14 by means of the gripper and cleaning blades 54 and 56 with a greater force than the engagement of sides 30 and 32 with the platens 12 and 14. In FIG. 5C, first air bladder actuating means 20 is inflated. Since sides 36 and 38 of section 18 grip the inside of the platen 12 with a greater force than the sides 30 and 32 of section 16, section 16 is moved to the right causing its blades 50 and 52 to scrape and clean the inside of the platens 12 and 14, respectively.

Figure 5E:
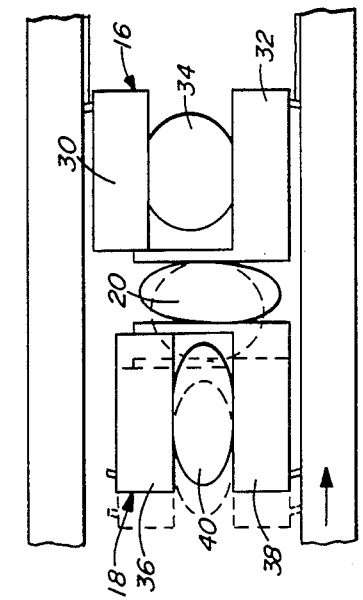
Figure 5D:
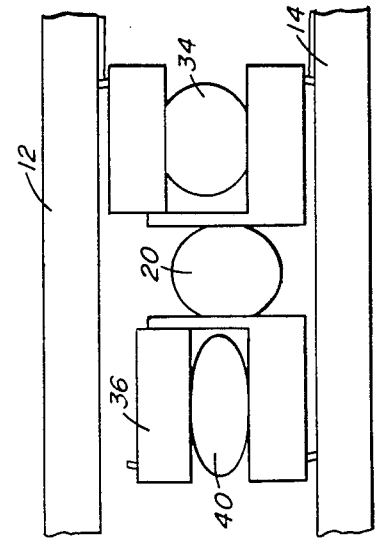

In FIG. 5D, air bladder 40 is deactuated and air bladder 20 is deactuated. In FIG. 5E, air bladder 20 is deactuated and section 18 is retracted toward section 16. This may be accomplished by placing a vacuum in the air bladder 20 to move the loosened section 18 toward the gripping section 16. As an alternative, as an additional force, spring return means 62 (FIGS. 2 and 3) may be provided. The cycle begins again to move further along and scrape the insides of platens 12 and 14.

The robot 10 can be reversed and move from right to left by reversing the sequence. And, of course, by selectively inflating bladder parts 21 and 23 of the first air bladder actuating means 20, the direction of movement of the robot 10 may be changed so as to maintain the desired steering direction.

Referring now to the schematic 60 of the control circuit, the circuit includes valves 70, 71, 72, 73, 74 and 75, a vacuum pump 76, a shuttle valve 77, an air pressure line 78, a vacuum exhaust line 79, and an exhaust line 80.

Valves 70 and 71 control the admission and exhaust of air to the inlet 42 for the bladder 34. Valve 71 receives pressurized air from the pressure air inlet line 78 through a line 81 to a first low pressure regulator 82 or a second high pressure regulator 83. Therefore, actuation of the valve 71 will determine, when valve 70 is actuated, whether air bladder 34 will receive high pressure from regulator 83 for gripping and holding against the inside of the platens 12 and 14 by the section 16 or whether the bladder 34 only receives low pressure air through the regulator 82 for merely engaging the inside of the platens 12 and 14 so that the scrapers 50 and 52 may scrape and clean the inside of the platens.

Similarly, valves 72 and 73 provide pressurized air through the port 44 to the bladder 40. Valve 73 is connected to the air inlet line 78 through line 84 through low pressure regulator 85 or high pressure regulator 86. Therefore, actuation of the solenoid valve 73 determines whether or not high or low pressure air is to be supplied to the bladder 40 and valve 72 determines whether to supply the selected pressurized air or exhaust air from the bladder 40.

Valve 74 supplies pressurized air from the line 78 through line 87 and pressure regulator 88 to the inlet 25 to the bladder part 21. Similarly, valve 75 supplies air from the pressure line 78 through line 89 and pressure regulator 90 to the air inlet 27 to the bladder part 23. It is to be noted that valves 74 and 75 exhaust through lines 91 and 92, respectively, to the vacuum exhaust line 79 for placing a vacuum on bladder parts 21 and 23 to provide a return of sections 16 and 18 together. While the control circuit 60 may be operated manually by suitably actuating the solenoid valves 70-75, preferably they are connected to a suitable control such as a programmed computer.

The present invention, therefore, is well adapted to carry out the objects and attain the ends and advantages mentioned as well as others inherent therein. While an embodiment of the invention has been given for the purpose of disclosure, numerous changes in the details of construction and arrangement of parts will readily suggest themselves to those skilled in the air and which are encompassed within the spirit of the invention and the scope of the appended claims.

What is claimed is:

1. A robot cleaner for cleaning the surface of at least a first plate spaced from a parallel second plate comprising, a body having first and second sections connected together but movable relative to each other, first actuating means connected to said first and second sections for moving said sections away and toward each other for moving said sections parallel to said first and second plates when said body is positioned between said first and second plates, said first section having first and second sides connected together but movable relative to each other, second actuating means connected to said first and second sides for moving said first and second sides transverse to said first and second plates when the body is positioned between said first and second plates, said second section having third and fourth sides connected together but movable relative to each other, third actuating means connected to said third and fourth sides for moving said third and fourth sides transverse to said first and second plates when the body is positioned between said first and second plates, cleaning means on at least one side of each of the sections for positioning against the first plate for cleaning the first plate when the cleaning means engages and moves along the plate, and control means connected to the first, second and third actuating means for sequentially gripping the first and second plates by one of the sections and moving the other section parallel to and across the first plate.

2. The apparatus of claim 1 including,
cleaning means on each of the sides for engaging and cleaning the inside of both the first and second plates.

3. The apparatus of claim 1 wherein the first, second and third actuating means include fluid actuated resilient containers.

4. The apparatus of claim 1 wherein the control means includes different pressure force means for selective application to the second and third actuating means.

5. The apparatus of claim 1 wherein the first actuation means includes first and second transverse means for controlling the direction of movement of the body.

6. A robot cleaner for insertion between first and second spaced and parallel press platens for cleaning the platens comprising,
a body having first and second sections connected together but movable relative to each other, first air bladder actuating means connected between said first and second sections for moving said sections away and toward each other for moving said sections in a direction parallel to said first and second platens when said body is positioned between said first and second platens, said first section having first and second sides connected together but movable relative to each other, second air bladder actuating means connected between said first and second sides for moving said first and second sides transverse to said first and second platens when the body is positioned between said first and second platens, said second section having third and fourth sides connected together but movable relative to each other, third air bladder actuating means connected between said third and fourth sides for moving said third and fourth sides transverse to said first and second platens when the body is positioned between said first and said second platens, a scraper blade on each of the sides for engaging one of the platens when the sides are moved transversely by the second and third bladder actuating means, and control means connected to the first, second and third actuating means for engaging the first and second platens with the blades of one section while engaging the first and second platens with the blades of the other section with a greater force than the blades of the one section, and moving the one section to and across the first and second platens.

7. The apparatus of claim 6 wherein the first air bladder actuating means includes two longitudinal aligned compartments for steering and controlling the direction of movement of the body.

8. The apparatus of claim 6 wherein the control means includes first and second different air pressure levels for application to the second and third actuating means moving the body across the platen.

* * * * *